United States Patent
Chen et al.

(10) Patent No.: US 10,010,850 B2
(45) Date of Patent: Jul. 3, 2018

(54) NON-CONTACT REACTOR AND NANOCRYSTAL FABRICATION SYSTEM HAVING THE SAME

(71) Applicant: National Tsing Hua University, Hsinchu (TW)

(72) Inventors: Hsueh-Shih Chen, Hsinchu (TW); Shih-Jung Ho, Tainan (TW); Chang-Wei Yeh, Taoyuan (TW)

(73) Assignee: National Tsing Hua University (TW)

( * ) Notice: Subject to any disclaimer, the term of this patent is extended or adjusted under 35 U.S.C. 154(b) by 18 days.

(21) Appl. No.: 15/402,311

(22) Filed: Jan. 10, 2017

(65) Prior Publication Data

US 2018/0050316 A1     Feb. 22, 2018

(30) Foreign Application Priority Data

Aug. 17, 2016    (TW) .............................. 105126226 A

(51) Int. Cl.
    *B01J 4/00*             (2006.01)
    *B01J 14/00*           (2006.01)
                   (Continued)

(52) U.S. Cl.
    CPC ............ *B01J 14/00* (2013.01); *B01D 21/262* (2013.01); *B01J 4/008* (2013.01); *B01J 19/0013* (2013.01); *B01J 19/0066* (2013.01); *B01J 19/06* (2013.01); *C09K 11/883* (2013.01); *B01J 2204/007* (2013.01); *B01J 2219/00063* (2013.01);
                   (Continued)

(58) Field of Classification Search
    CPC ...... B01D 21/00; B01D 21/26; B01D 21/262; B01J 4/00; B01J 4/008; B01J 14/00; B01J 19/00–19/0013; B01J 19/0053; B01J 19/0066; B01J 19/06; B01J 19/24; B01J 2204/00; B01J 2204/007; B01J 2219/00049–2219/00058; B01J 2219/00063; C09K 11/00; C09K 11/08; C09K 11/88–11/883; Y10S 977/00; Y10S 977/70; Y10S 977/773; Y10S 977/774; Y10S 977/84; Y10S 977/895;
(Continued)

(56) References Cited

U.S. PATENT DOCUMENTS

| 8,048,192 B2 * | 11/2011 | Diaz | .......................... B01J 8/20 427/436 |
| 2016/0136732 A1 * | 5/2016 | Komatsu | .................. B22F 9/02 75/370 |

FOREIGN PATENT DOCUMENTS

WO    WO-2015004770 A1 *   1/2015          B22F 9/02

* cited by examiner

*Primary Examiner* — Natasha E Young

(57) ABSTRACT

The present invention mainly provides a non-contact reactor consisting of a reaction vessel having a particularly-designed size, a plurality of injection modules, an agitator, a heat exchange module, and an electrical gate valve module. Operators can inject at least one precursor solution into the reaction nanometer-scale semiconductor crystallites vessel and make the injected precursor solution reach a specific position in the reaction vessel by using the electrical gate valve to control the injection pressure of the injection modules. Moreover, the operators can further control the rotation speed of the agitator through a controller, so as to evenly and quickly mix the injected precursor solution and a specific solution pre-filled into the reaction vessel to a mixture solution; therefore, the acceleration of production rate and the enhance of production yield of the semiconductor nanocrystals are carried out.

19 Claims, 4 Drawing Sheets

(51) Int. Cl.
  *B01J 19/00* (2006.01)
  *B01J 19/06* (2006.01)
  *B01J 19/24* (2006.01)
  *B01D 21/26* (2006.01)
  *C09K 11/88* (2006.01)
  *B82Y 20/00* (2011.01)
  *B82Y 40/00* (2011.01)
  *B82Y 30/00* (2011.01)

(52) U.S. Cl.
  CPC ............... *B82Y 20/00* (2013.01); *B82Y 30/00* (2013.01); *B82Y 40/00* (2013.01); *Y10S 977/774* (2013.01); *Y10S 977/896* (2013.01); *Y10S 977/95* (2013.01)

(58) Field of Classification Search
  CPC ............. Y10S 977/896; Y10S 977/902; Y10S 977/932; Y10S 977/949; Y10S 977/95
  See application file for complete search history.

NON-CONTACT REACTOR AND NANOCRYSTAL FABRICATION SYSTEM HAVING THE SAME

CROSS-REFERENCE TO RELATED APPLICATIONS

This application claims priority to Taiwanese Patent Application No. TW 105126226, filed on Aug. 17, 2016.

BACKGROUND OF THE INVENTION

1. Field of the Invention

The present invention relates to the technology field of nanocrystals, and more particularly to a non-contact reactor for producing the nanocrystals and a nanocrystals fabrication system having the same.

2. Description of the Prior Art

Quantum dots (QDs) are nanometer-scale semiconductor crystallites composed of elements from groups III-V, II-VI, or IV-VI listed in the periodic table. Zinc sulfide (ZnS), a first discovered semiconductor nanocrystal, is one kind of direct wide-bandgap semiconductor having many outstanding properties, such as the presence of polar surfaces, excellent transport properties, good thermal stability, and high electronic mobility. Besides the zinc sulfide, there has many semiconductor nanocrystals being discovered or developed, including: cadmium selenide (CdSe), lead sulfide (PbS) and indium phosphide (InP).

Quantum dots (QDs) have been broadly applied in different technology fields of life sciences, electronics, optics, electro-optics, and solar energy. Moreover, researchers have reported that the optical properties of light absorption and light emission of QDs are dependent on their elemental compositions, surface-attached ligands, and particle size. So that, compound QDs with different light absorption and light emission characteristics, for example, copper-doped ZnSe and core-shell CdSe/ZnS QDs, are hence researched and developed by changing or modulating the elemental compositions, the surface-attached ligands, or the particle size of QDs. An exemplary method for manufacturing compound QDs has been disclosed in U.S. Pat. No. 7,192,850, which comprises following steps of manufacturing processes:

step (a): providing a first precursor solution containing a group II element and a second precursor solution containing a group VI element, wherein the said group II element can be zinc (Zn), cadmium (Cd), or mercury (Hg);

step (b): heating and mixing the first precursor solution and the second precursor solution for forming a mixed solution having a plurality of cores of quantum dots dispersing therein; and step (c): adding a third precursor solution containing a group VI element and a forth precursor solution having at least one dopant into the mixed solution alternatively at a fixed time interval, so as to form quantum dots wrapped with dopant; wherein the dopant can be a transitional metal or a halogen element, and the said group II element being oxygen (O), sulfur (S), selenium (Se), or tellurium (Te).

In order to enhance production rate and production yield, QD manufactures often adopt a reactor to expedite the production of QDs manufactured by using the aforesaid steps. FIG. 1 shows a cross-sectional view of a conventional reactor. The said reactor 1' mainly consists of a reaction vessel 11' and a heater 12', wherein an agitator 13' is disposed in the reaction vessel 11', and the rotation speed the stirring paddles 131' of the agitator 13' is controlled by an external driving and controlling device. It is worth noting that, for mixing the precursor solutions evenly, a deep tube 14' is used to make precursor solutions be injected into the reactor 1' and reach a peripheral position of the stirring paddles 131' where the tangential force is up to a maximum value. However, since the deep tube 14' is one kind of contact type apparatus, the use of the deep tube 14' would cause the remains of the precursor solutions or others organic solutions such as tri-n-octylphosphine (TOP) be left on the inner walls of the reaction vessel 11' and the outside surface of the agitator 13'; eventually, these remains will become the pollution sources of next-batch-produced QDs.

Accordingly, in view of the conventional semiconductor nanocrystals manufacturing reactor showing many drawbacks and shortcomings in practical QD production, the inventors of the present application have made great efforts to make inventive research thereon and eventually provided a non-contact reactor and a nanocrystals fabrication system having the same.

SUMMARY OF THE INVENTION

The primary objective of the present invention is to provide a non-contact reactor and a nanocrystals fabrication system having the same. Differing from conventional semiconductor nanocrystals manufacturing reactor often disposed with a contact type deep tube, the present invention provides a non-contact reactor consisting of: a reaction vessel having a particularly-designed size, a plurality of injection modules, an agitator, a heat exchange module, and an electrical gate valve module. When this non-contact reactor is operated to produce nanometer-scale semiconductor crystallites, operators are able to inject at least one precursor solution into the reaction vessel and make the injected precursor solution reach a specific position in the reaction vessel by using the electrical gate valve to control the injection pressure of the injection modules. Moreover, the operators can further drive the rotation speed of the agitator through a controller, so as to evenly and quickly mix the injected precursor solution and a specific solution pre-filled into the reaction vessel to a mixture solution; therefore, the acceleration of production rate and the enhance of production yield of the semiconductor nanocrystals are carried out.

In order to achieve the primary objective of the present invention, the inventor of the present invention provides one embodiment for the non-contact reactor, comprising:

a reaction vessel, being provided with a reaction space therein;

a plurality of inject modules, being disposed over the reaction vessel, wherein each of the inject modules have an injection nozzle located over the liquid level of a specific solution pre-filled into the reaction space;

an agitator, being electrically connected to an external driving and controlling device, and having at least one stirring paddles located in the reaction space;

a heat exchanging module, being connected to the outer wall of the reaction vessel, and comprising a heat exchanging channel, a fluid inlet communicating with the heat exchanging channel and a fluid outlet communicating with the heat exchanging channel; wherein a fluid with a specific temperature can be inputted into the heat exchanging channel via the fluid outlet, and then the fluid would be outputted via the fluid outlet after a heat exchanging process is carried out between the fluid and the reaction vessel in the heat exchanging channel; and an electrical gate valve, being electrically connected to the inject modules, wherein the inject modules are able to inject one or multi precursor solutions into an assigning position of the reaction space based on an injection pressure by the controlling the electrical gate valve, so as to make the precursor solutions and the solution pre-filled into the reaction space mix to each other evenly and quickly.

Moreover, for achieving the primary objective of the present invention, the inventor of the present invention further provides another one embodiment for the nanocrystals fabrication system, comprising:

a plurality of precursor storage tanks, for accommodating various precursor solutions;

a non-contact reactor, comprising:
  a reaction vessel, being provided with a reaction space therein;
    a plurality of inject modules, being disposed over the reaction vessel, wherein each of the inject modules have an injection nozzle located over the liquid level of a solution pre-filled into the reaction space;
  an agitator, being electrically connected to an external driving and controlling device, and having at least one stirring paddles located in the reaction space;
  a heat exchanging module, being connected to the outer wall of the reaction vessel, and comprising a heat exchanging channel, a fluid inlet communicating with the heat exchanging channel and a fluid outlet communicating with the heat exchanging channel; wherein a fluid with a specific temperature can be inputted into the heat exchanging channel via the fluid outlet, and then the fluid would be outputted via the fluid outlet after a heat exchanging process is carried out between the fluid and the reaction vessel in the heat exchanging channel; and
  an electrical gate valve, being electrically connected to the inject modules, wherein the inject modules are able to inject one or multi precursor solutions into an assigning position of the reaction space based on an injection pressure by the controlling the electrical gate valve, so as to make the precursor solutions and the solution pre-filled into the reaction space mix to each other evenly and quickly;

a harvest tank, being connected to an output port of the reaction vessel, and used for collecting a plurality of nanometer-scale semiconductor crystallites, the precursor solutions and the solution pre-filled into the reaction space; wherein the nanometer-scale semiconductor crystallites is produced after a reaction process between the precursor solutions and the solution pre-filled into the reaction space is finished;

a centrifuge, being connected to the harvest tank for treating the precursor solutions and the solution pre-filled into the reaction space with a centrifugation process, so as to precipitate the nanometer-scale semiconductor crystallites; and a storage tank, being connected to the centrifuge for collecting and storing the nanometer-scale semiconductor crystallites.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a non-contact reactor and a nanocrystals fabrication system having the non-contact reactor according to the present invention, embodiments of the present invention will be described in detail with reference to the attached drawings hereinafter.

Figure 2:
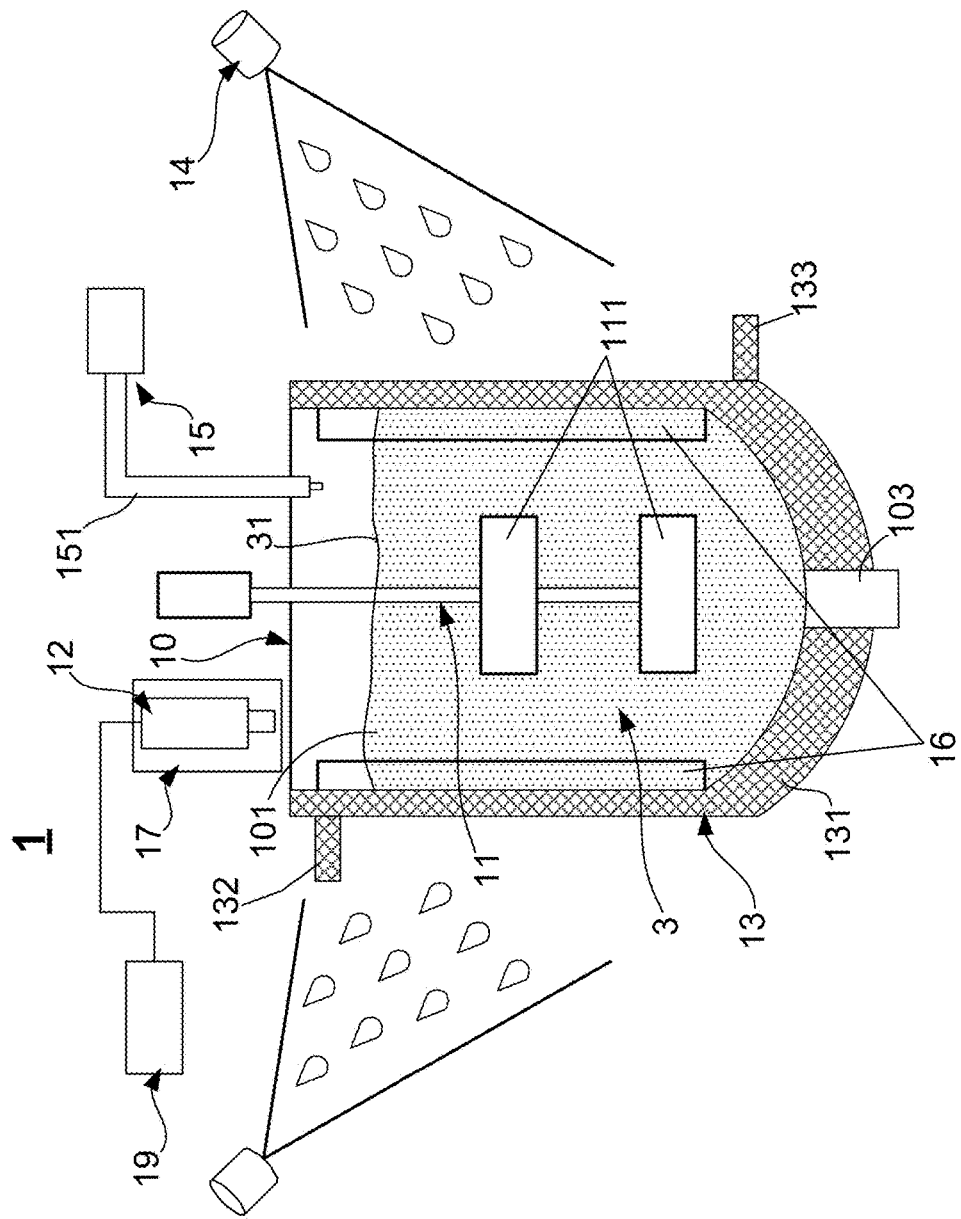
FIG. 2 shows a cross-sectional view of a non-contact reactor according to the present invention.

With reference to FIG. 2, where provides a cross-sectional view of a non-contact reactor according to the present invention. As FIG. 2 shows, the non-contact reactor 1 of the present invention mainly consists of: a reaction vessel 10 having a reaction space 101, a plurality of inject modules 12, an agitator 11, a heat exchanging module 13, and an electrical gate valve 19. In which, the inject modules 12 are electrically connected to the electrical gate valve 19 and disposed over the reaction vessel 10, wherein each of the inject modules 12 have an injection nozzle located over the liquid level 31 of a solution 3 pre-filled into the reaction space 101. the solution 3 can be a precursor solution or others organic solutions such as oleic acid or n-octadecane. In the present invention, the inject modules 12 are able to inject one or multi precursor solutions into an assigning position of the reaction space 101 based on an injection pressure by the controlling the electrical gate valve 19. The said injection pressure is commonly in a range from 0 Mpa to 3 Mpa, and the said assigning position is in a range from one quarter of the depth of the reaction space 101 to three fourths of the depth of the reaction space 101.

On the other hand, the agitator 11 is electrically connected to an external driving and controlling device, and has stirring paddles 111 located in the reaction space 101. In the present invention, the rotation speed of the stirring paddles 111 is controlled by the driving and controlling device, therefore the precursor solutions and the solution 3 pre-filled into the reaction vessel 10 are facilitated to mix with each other evenly and quickly. Moreover, it is worth explaining that, the present invention particularly disposes a plurality of baffles 16 in the reaction vessel 10, and the baffles 16 are used for guiding the precursor solutions injected into the reaction space 101 in order to prevent parts of the injected precursor solutions remain on the inner wall of the reaction vessel 10. Besides, a protection chamber 17 is adopted by the present invention for accommodating the inject modules 12, so as to avoid the precursor solutions from being contaminated or influenced by the gas in the reaction space 101. It is worth further explaining that, the protection chamber 17 filled with an inert gas with positive pressure, such as argon gas.

Because a solution temperature in the reaction space 101 must be alternatively risen and lowered during the fabrication of the nanometer-scale semiconductor crystallites, a heat exchanging module 13 is connected to the outer wall of the reaction vessel 10. As FIG. 2 shows, the heat exchanging module 13 comprises a heat exchanging channel 131, a fluid inlet 132 communicating with the heat exchanging channel 131 and a fluid outlet 132 communicating with the heat exchanging channel 131. Therefore, engineers can easily heating the reaction vessel 10 by inputting a high-temperature fluid into the heat exchanging channel 131 via the fluid inlet 132. On the contrary, engineers can also cooling the reaction vessel 10 by inputting a low-temperature fluid into the heat exchanging channel 131 via the fluid inlet 132. The heat exchanging module 13 can also be an electro-thermal device while the reaction scale is small.

For clearly describing the practicability of the non-contact reactor 1 on producing the nanometer-scale semiconductor crystallites, an exemplary manufacturing process flow completed by using non-contact reactor 1 is provided as follows:

step (1): filling a first precursor solution containing zinc (Zn) and cadmium (Cd) into the reaction space 101 of the reaction vessel 10, and then rising the solution temperature of the first precursor solution to 260° C. through the heat exchanging module 13;

step (2): using the inject modules 12 to inject a second precursor solution containing selenium (Se) and sulfur (S) into the reaction space 101, such that a first reaction would occur between the first precursor solution and the second precursor solution;

step (3): rising the solution temperature of a mixture solution of the first precursor solution and the second precursor solution to 320° C. through the heat exchanging module 13, so as to induce a second reaction occurring between the first precursor solution and the second precursor solution;

step (4): lowering the solution temperature of the mixture solution to 160° C. through the heat exchanging module 13, and then keep the solution temperature at 160° C.;

step (5): further cooling the solution temperature by using the heat exchanging module 13, and then outputting the mixture solution through an output port 103 of the reaction vessel 10;

step (6): washing the mixture solution by an eluent such as toluene or ethanol, so as to obtain nanometer-scale semiconductor crystallites with a multi-pod-structured outer shell; wherein the semiconductor nanocrystal is ZnSe/$Zn_xCd_{1-x}Se_yS_{1-y}$/ZnS.

Although FIG. 2 does not especially show a temperature sensor, engineers can dispose temperature sensors in the reaction vessel 10 for monitoring the solution temperature in the reaction space 101, so as to precisely rise or lower the solution temperature to a target temperature when using this non-contact reactor 1 to producing the semiconductor nanocrystals. Moreover, as FIG. 2 shows, the present invention further adding a spray cooling module 14 into the framework of the non-contact reactor 1, wherein the spray cooling module 14 is opposite to the outer wall of the reaction vessel 10, and used for spraying a temperature lowering medium to the outer wall of the reaction vessel 10 while the second reaction (the step (3)) is finished, in order to fast lower the solution temperature of the mixture solution in the reaction vessel 10. In addition, an injection-type temperature lowering module 15 having an injection tube 151 located over the liquid level 31 of the solution 3 is also added into the framework of the non-contact reactor 1, wherein injection-type temperature lowering module 15 is used for injecting a temperature lowering medium such as centrifugal liquid or eluent solution. Moreover, an internal heat-exchanging coil can quickly lower the reaction temperature after reaction completed. To quench the reaction temperature as quickly as possible, all of the device above that can be simultaneously launched by a communicating unit.

It is worth noting that, in spite of above-mentioned 6 steps containing just one precursor solution injecting process, it does not mean others manufacturing process flows for producing nanocrystals also contain one precursor solution injecting process. For instance, the method for producing Zn/Se/I/ZnSe/ZnSe quantum dots disclosed in U.S. Pat. No. 7,192,850 comprises a particular method step to carry out the precursor solution injection by alternatively injecting a first TOP solution containing selenium (Se) and a second TOP solution containing iodine ($I_2$) into a mixture solution containing ZnSe quantum dots, wherein the alternatively injection of the first TOP solution and the second TOP solution must be repeatedly executed for 3 times based a specific frequency of 1 time/min.

On the other hand, even though FIG. 2 does not show the non-contact reactor 1 containing any devices or modules for picking nanocrystal samples out of the reaction vessel 10, engineers can add a sample collecting module having a pickup tube into the framework of the non-contact reactor 1. Thus, during the production of the semiconductor nanocrystals, engineers can stretch the pickup tube into the reaction space 101 so as to collect the nanocrystal samples out for carrying out structure or composition analysis; therefore, when engineers find the layer number of shell is insufficient, the engineers can repeatedly execute precursor solution injecting process with once or more times to make up the deficiency.

Figure 3:
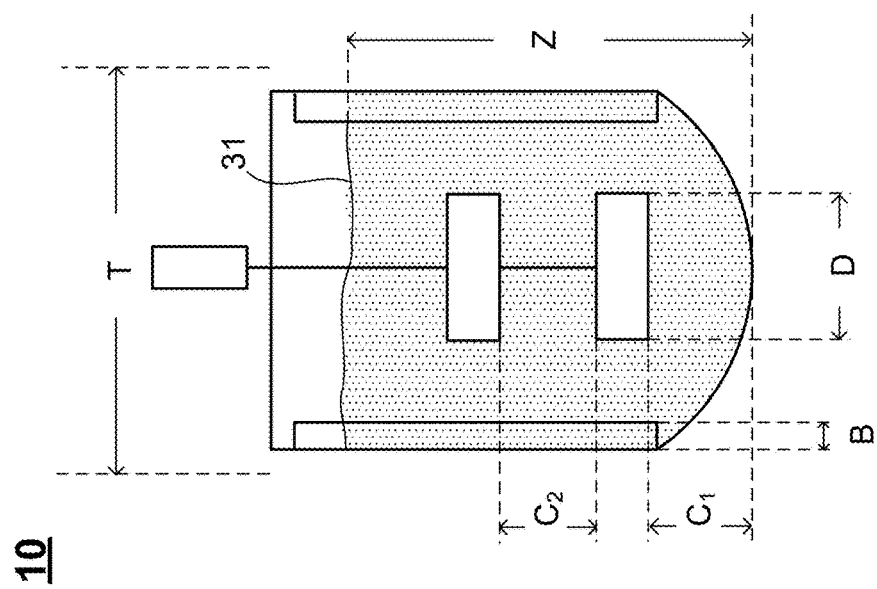
FIG. 3 shows a cross-sectional view of a reaction vessel of the non-contact reactor.

Please continuously refer to FIG. 3, which illustrates shows a cross-sectional view of the reaction vessel. For making this non-contact reactor 1 be able to show a great performance on producing nanometer-scale semiconductor crystallites, the present invention particularly designs the sizes and dimensions of the reaction vessel 10. It is worth noting that, the drawing of FIG. 3 does not be marked with any numeric element symbols in order to highlight a plurality of dimension symbols marked in cross-sectional view of the reaction vessel 10. Moreover, the descriptions for the critical size symbols are integrated in following Table (1).

TABLE (1)

| Dimension symbol | Description |
| --- | --- |
| T | Lateral width of the reaction vessel 10 |
| Z | Distance from the liquid level 31 to the bottom of the reaction space 101; moreover, it is also considered as the depth of the reaction space 101. |
| B | Length of the baffle 16 |
| D | Diameter of the stirring paddles 111 |
| $C_1$ | Distance from the bottom of the reaction space 101 to the stirring paddle 111 most close to the reaction space's bottom. |
| $C_2$ | Distance between two adjacent stirring paddles 111 |

In order to make this non-contact reactor 1 be able to show a great performance on producing nanometer-scale semiconductor crystallites, the present invention provides five dimension design rules for designing and manufacturing the reaction vessel 10, wherein the five dimension design rules are listed in following Table (2).

TABLE (2)

| Dimension symbol | Dimension design rules |
| --- | --- |
| T | 1. B/T = $\frac{1}{10}$~$\frac{1}{12}$ |
| Z | 2. the number of baffles is 4 |
| B | 3. D = ($\frac{1}{2}$~$\frac{1}{4}$)T |
| D | 4. C1 = ($\frac{1}{3}$)T |
| $C_1$ | 5. C2 = D |
| $C_2$ | |

On the other hand, above-mentioned non-contact reactor can be further integrated to an automation nanocrystals fabrication system with some others process apparatus. Please refer to FIG. 4, where a framework view of a nanocrystals fabrication system according to the present invention is provided. As FIG. 4 shows, the nanocrystals fabrication system 2 consists of: a plurality of precursor storage tanks 21, the non-contact reactor 1 shows in FIG. 2, a harvest tank 22, a centrifuge 23, and a storage tank 24.

Figure 4:
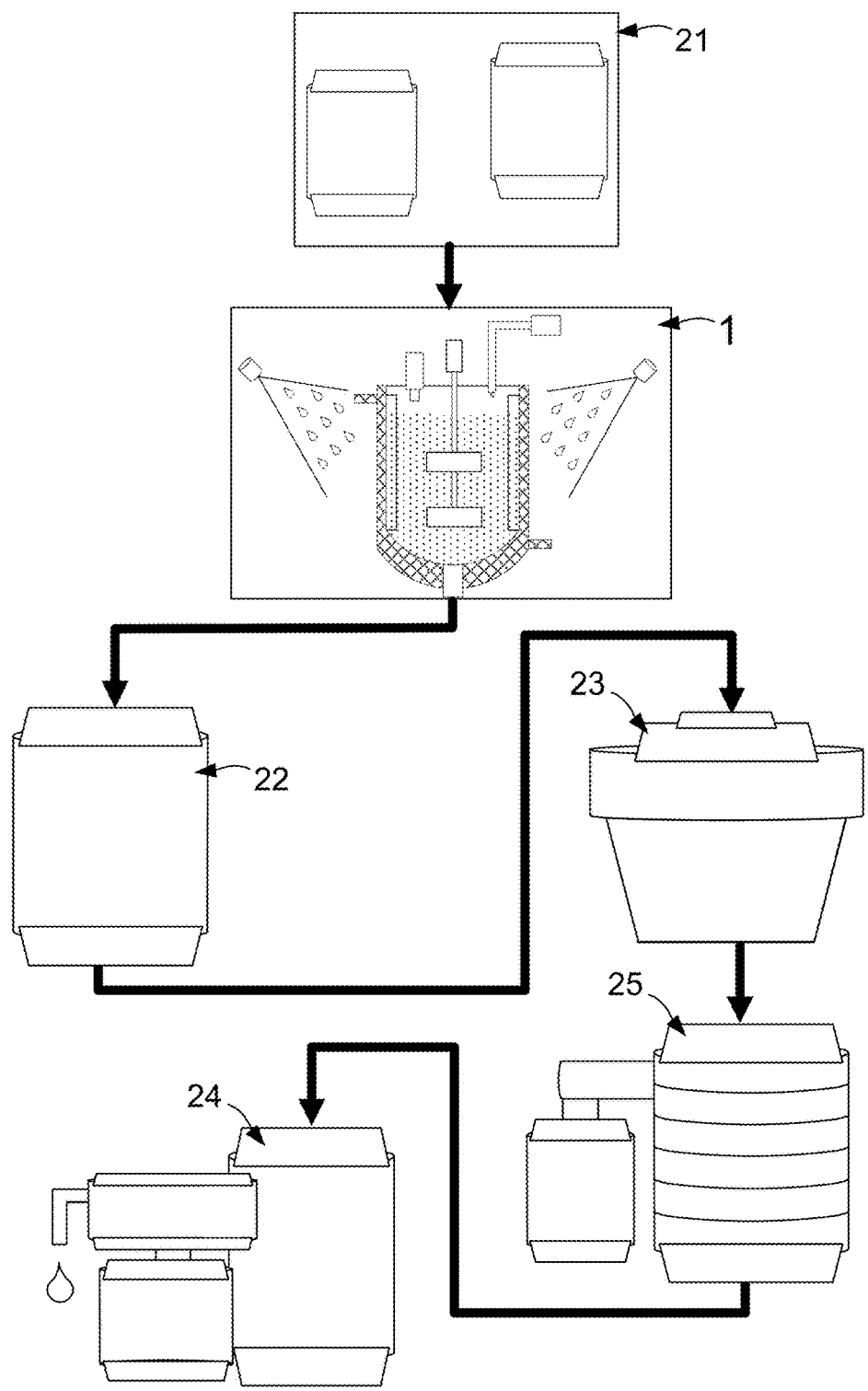
FIG. 4 shows a framework view of a nanocrystals fabrication system according to the present invention.

When using the nanocrystals fabrication system 2 of FIG. 4 to carry out a batch production of the nanometer-scale semiconductor crystallites, the various precursors stored in the precursor storage tanks 21 are firstly transmitted to the inject modules 12. Subsequently, the non-contact reactor 1 would finish the manufacturing process flow consisting of above-provided steps (1)-(5); and then, in the step (6), the nanometer-scale semiconductor crystallites with the multi-pod-structured outer shell are therefore produced after washing the mixture solution by using at least one eluent solution. Eventually, the mixture solution containing with the nanometer-scale semiconductor crystallites are next transmitted to the harvest tank 22 via the output port 103 of the reaction vessel 10.

Generally, for obtaining the nanometer-scale semiconductor crystallites, the mixture solution containing semiconductor nanocrystals must be subsequently transmitted to the centrifuge 23, for making the nanometer-scale semiconductor crystallites precipitate in the centrifuge 23 after a centrifugation process is completed by the centrifuge 23. It is worth further explaining that, a concentrator 23 is connected between the centrifuge 23 and the storage tank 24, and used for removing organic solvents remaining on the nanometer-scale semiconductor crystallites, so as to enhance the purity of the semiconductor nanocrystals.

Figure 1:
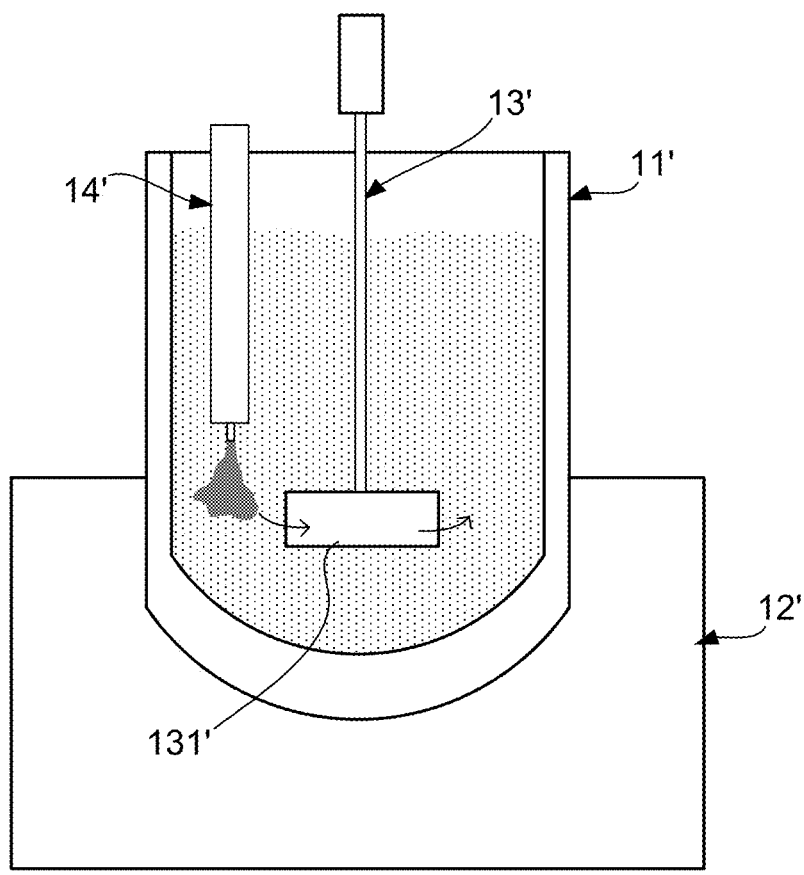
FIG. 1 shows a cross-sectional view of a conventional reactor.

Therefore, through above descriptions, the non-contact reactor and the nanocrystals fabrication system provided by the present invention has been introduced completely and clearly; in summary, the present invention includes the advantages of:

(1) Differing from conventional semiconductor nanocrystals manufacturing reactor often disposed with a contact type deep tube 14' (as shown in FIG. 1), the present invention provides a non-contact reactor 1 consisting of: a reaction vessel 10 having a particularly-designed size, a plurality of injection modules 12, an agitator 11, a heat exchange module 13, and an electrical gate valve module 19. When this non-contact reactor 1 is operated to produce nanometer-scale semiconductor crystallites, operators are able to inject at least one precursor solution into the reaction vessel 10 and make the injected precursor solution reach a specific position in the reaction vessel 10 by using the electrical gate valve 19 to control the injection pressure of the injection modules 12. Moreover, the operators can further drive the rotation speed of the agitator 11 through an external controller, so as to evenly and quickly mix the injected precursor solution and a specific solution pre-filled into the reaction vessel 10 to a mixture solution; therefore, the acceleration of production rate and the enhance of production yield of the semiconductor nanocrystals are carried out.

The above description is made on embodiments of the present invention. However, the embodiments are not intended to limit scope of the present invention, and all equivalent implementations or alterations within the spirit of the present invention still fall within the scope of the present invention.

What is claimed is:

1. A non-contact reactor, comprising:
   a reaction vessel, being provided with a reaction space therein;
   a plurality of inject modules, being disposed over the reaction vessel, wherein each of the inject modules have an injection nozzle located over the liquid level of a solution pre-filled into the reaction space;
   an agitator, being electrically connected to an external driving and controlling device, and having at least one stirring paddles located in the reaction space;
   a heat exchanging module, being connected to the outer wall of the reaction vessel, and comprising a heat exchanging channel, a fluid inlet communicating with the heat exchanging channel and a fluid outlet communicating with the heat exchanging channel; wherein a fluid with a specific temperature can be inputted into the heat exchanging channel via the fluid outlet, and then the fluid would be outputted via the fluid outlet after a heat exchanging process is carried out between the fluid and the reaction vessel in the heat exchanging channel; and
   an electrical gate valve, being electrically connected to the inject modules, wherein the inject modules are able to inject one or multi precursor solutions into an assigning position of the reaction space based on an injection pressure by the controlling the electrical gate valve, so as to make the precursor solutions and the solution pre-filled into the reaction space mix to each other evenly and quickly;
   wherein the inject module has a temperature controlled device configured for pre-heating the precursor solution from room temperature to 300° C. to precisely control the temperature drop in the reaction vessel after the injection of the precursor solution is completed.

2. The non-contact reactor of claim 1, further comprising a spray cooling module, being opposite to the outer wall of the reaction vessel, and used for spraying a temperature lowering medium to the outer wall of the reaction vessel while a reaction process between the precursor solutions and the solution pre-filled into the reaction space is finished.

3. The non-contact reactor of claim 1, further comprising an injection-type temperature lowering module having an injection tube located over the liquid level of the solution pre-filled into the reaction space, wherein the injection-type temperature lowering module is used for injecting a temperature lowering medium into the reaction space when a reaction process between the precursor solutions and the solution pre-filled into the reaction space is finished.

4. The non-contact reactor of claim 1, further comprising an internal heat-exchanging coil module, wherein the internal heat-exchanging coil module has a large heat exchange area located in the reaction space and is used for flowing a pre-cooling heat-exchanging medium into the coil when the reaction is finished.

5. The non-contact reactor of claim 1, further comprises:
   a sample collecting module, having a pickup tube for entering the reaction space;
   a temperature sensor, being disposed in the reaction vessel for monitoring a solution temperature in the reaction space; and
   at least one protection chamber, being filled with an inert gas with positive pressure therein, and used for accommodating the inject modules.

6. The non-contact reactor of claim 1, wherein a plurality of baffles are disposed in the reaction vessel for guiding the precursor solutions injected into the reaction space.

7. The non-contact reactor of claim 1, wherein a plurality of nanometer-scale semiconductor crystallites would be produced when a reaction process between the precursor solutions and the solution pre-filled into the reaction space is finished; moreover, the nanometer-scale semiconductor crystallites can be outputted through an output port of the reaction vessel.

8. The non-contact reactor of claim 1, wherein the injection pressure is in a range from 0 Mpa to 3 Mpa.

9. The non-contact reactor of claim 1, wherein the assigning position is in a range from one quarter of the depth of the reaction space to three fourths of the depth of the reaction space.

10. The non-contact reactor of claim 1, wherein the rotation speed of the stirring paddles is controlled by the driving and controlling device.

11. A nanocrystals fabrication system, comprising:
a plurality of precursor storage tanks, for accommodating various precursor solutions;
a non-contact reactor, comprising:
   a reaction vessel, being provided with a reaction space therein;
   a plurality of inject modules, being disposed over the reaction vessel, wherein each of the inject modules have an injection nozzle located over the liquid level of a solution pre-filled into the reaction space;
   an agitator, being electrically connected to an external driving and controlling device, and having at least one stirring paddles located in the reaction space;
   a heat exchanging module, being connected to the outer wall of the reaction vessel, and comprising a heat exchanging channel, a fluid inlet communicating with the heat exchanging channel and a fluid outlet communicating with the heat exchanging channel; wherein a fluid with a specific temperature can be inputted into the heat exchanging channel via the fluid outlet, and then the fluid would be outputted via the fluid outlet after a heat exchanging process is carried out between the fluid and the reaction vessel in the heat exchanging channel; and
   an electrical gate valve, being electrically connected to the inject modules, wherein the inject modules are able to inject one or multi precursor solutions into an assigning position of the reaction space based on an injection pressure by the controlling the electrical gate valve, so as to make the precursor solutions and the solution pre-filled into the reaction space to each other evenly and quickly;
a harvest tank, being connected to an output port of the reaction vessel, and used for collecting a plurality of nanometer-scale semiconductor crystallites, the precursor solutions and the solution pre-filled into the reaction space; wherein the nanometer-scale semiconductor crystallites is produced after a reaction process between the precursor solutions and the solution pre-filled into the reaction space is finished;
a centrifuge, being connected to the harvest tank for treating the precursor solutions and the solution pre-filled into the reaction space with a centrifugation process, so as to precipitate the nanometer-scale semiconductor crystallites; and
a storage tank, being connected to the centrifuge for collecting and storing the nanometer-scale semiconductor crystallites.

12. The nanocrystals fabrication system of claim 11, further comprising a spray cooling module, being opposite to the outer wall of the reaction vessel, and used for spraying a temperature lowering medium when a reaction process between the precursor solutions and the solution pre-filled into the reaction space is finished.

13. The nanocrystals fabrication system of claim 11, further comprising an injection-type temperature lowering module having an injection tube located over the liquid level of the solution pre-filled into the reaction space, wherein the injection-type temperature lowering module is used for injecting a temperature lowering medium into the reaction space when a reaction process between the precursor solutions and the solution is finished.

14. The nanocrystals fabrication system of claim 11, further comprises:
a sample collecting module, having a sample collecting tube for entering the reaction space;
a temperature sensor, being disposed in the reaction vessel for monitoring a solution temperature in the reaction space; and
at least one protection chamber, being filled with an inert gas with positive pressure therein, and used for accommodating the inject modules.

15. The nanocrystals fabrication system of claim 11, wherein a plurality of baffles are disposed in the reaction vessel for guiding the precursor solutions injected into the reaction space.

16. The nanocrystals fabrication system of claim 11, further comprising a concentrator connected between the centrifuge and the storage tank, wherein the concentrator is used for removing organic solvents remaining on the nanometer-scale semiconductor crystallites.

17. The nanocrystals fabrication system of claim 11, wherein the injection pressure is in a range from 0 Mpa to 3 Mpa.

18. The nanocrystals fabrication system of claim 11, wherein the assigning position is in a range from one quarter of the depth of the reaction space to three fourths of the depth of the reaction space.

19. The nanocrystals fabrication system of claim 11, wherein the rotation speed of the stirring paddles is controlled by the driving and controlling device.

* * * * *